(12) United States Patent
Conrad

(10) Patent No.: US 6,391,191 B2
(45) Date of Patent: May 21, 2002

(54) DOMESTIC WATER TREATMENT APPLIANCE

(75) Inventor: Wayne Conrad, Hampton (CA)

(73) Assignee: Fantom Technologies Inc. (CA)

( * ) Notice: Subject to any disclaimer, the term of this patent is extended or adjusted under 35 U.S.C. 154(b) by 0 days.

(21) Appl. No.: 09/758,181

(22) Filed: Jan. 12, 2001

Related U.S. Application Data

(63) Continuation-in-part of application No. 09/417,836, filed on Oct. 14, 1999, now Pat. No. 6,361,686.

(30) Foreign Application Priority Data

Jan. 14, 2000 (CA) .............................................. 2296129

(51) Int. Cl.[7] .............................. B01D 35/14; C02F 1/78
(52) U.S. Cl. ...................... 210/94; 210/192; 210/257.1; 210/258; 210/266; 250/435; 422/186.07
(58) Field of Search .............................. 210/94, 95, 97, 210/109, 110, 192, 257.1, 258, 266, 282, 295, 760, 806, 416.3; 422/24, 186.07, 186.3; 250/432 R, 435, 436

(56) References Cited

U.S. PATENT DOCUMENTS

| | | | |
|---|---|---|---|
| 3,692,180 A | 9/1972 | LaRaus ...................... 210/139 |
| 4,298,467 A | 11/1981 | Gartner et al. ............. 210/96.1 |
| 4,412,924 A | 11/1983 | Feather ....................... 210/744 |
| 4,599,166 A | 7/1986 | Gesslauer .................. 210/96.1 |
| 4,959,142 A | 9/1990 | Dempo ....................... 210/167 |
| 5,075,016 A | 12/1991 | Barnes ........................ 210/760 |
| 5,110,482 A | * 5/1992 | Shin | |
| 5,207,993 A | 5/1993 | Burris ......................... 422/256 |
| 5,558,775 A | * 9/1996 | Busch | |
| 5,582,717 A | 12/1996 | Di Santo ..................... 210/86 |
| 5,670,094 A | 9/1997 | Sasaki et al. ................. 261/27 |
| 5,683,576 A | 11/1997 | Olsen ......................... 210/138 |
| 5,698,091 A | * 12/1997 | Kuennen et al. ............. 210/192 |
| 5,709,799 A | 1/1998 | Engelhard ................... 210/748 |
| 5,711,887 A | 1/1998 | Gastman et al. ............ 210/748 |
| 5,741,416 A | 4/1998 | Tempest, Jr. ................. 210/90 |
| 5,765,403 A | 6/1998 | Lincoln et al. | |
| 5,766,488 A | 6/1998 | Uban et al. ................. 210/739 |
| 5,785,866 A | 7/1998 | Gehringer et al. .......... 210/748 |
| 5,900,143 A | 5/1999 | Dalton et al. ............... 210/192 |
| 5,928,506 A | * 7/1999 | Bae ............................. 210/94 |
| 6,058,718 A | * 5/2000 | Forsberg et al. | |

FOREIGN PATENT DOCUMENTS

| | | | |
|---|---|---|---|
| GB | 2257429 A | 11/1991 | |
| JP | 1299694 | 12/1989 | ................. 210/241 |

* cited by examiner

Primary Examiner—Joseph W. Drodge
(74) Attorney, Agent, or Firm—Bereskin & Parr

(57) ABSTRACT

A domestic countertop water treatment apparatus comprising a water treatment reservoir which is at least translucent; a housing having an ozone source in flow communication with the water treatment reservoir for treating water in the water treatment reservoir; a carbon block filter and a water pump mounted in the housing, the carbon block filter and the water pump in flow communication with the water treatment reservoir for removing treated water from the water treatment reservoir and passing the treated water through the carbon block filter; and, a treated water reservoir which is at least translucent and is positioned downstream from the carbon block filter for receiving treated water from the carbon block filter whereby, as treated water is dispensed from the water treatment reservoir to the treated water reservoir, the level of water in the water treatment reservoir is visibly lowered while the level of water in the treated water reservoir is visibly raised.

20 Claims, 6 Drawing Sheets

DOMESTIC WATER TREATMENT APPLIANCE

This application is a continuation in part of U.S. application Ser. No. 09/417,836 which was filed on Oct. 14, 1999 and which is U.S. Pat. No. 6,361,686.

FIELD OF THE INVENTION

This invention relates to water treatment apparatus which includes a filter member through which the water passes as it is treated in the apparatus. In a preferred embodiment, the apparatus, such as a countertop water treatment appliance, uses a gas, preferably ozone, as a water treatment agent.

BACKGROUND OF THE INVENTION

Water treatment apparatus using oxidizing gases have been developed. Some of these devices operate on a batch basis. According to this process, the water is placed in a treatment container and the treatment agent (e.g. a gas), is disbursed through the water, such as via a sparger. Following the completion of the cycle, the water may then be used. As part of the treatment process, the water may be passed through a filter member such as a carbon block filter. As water is passed through the carbon block filer, the operation of the filter results in the pores becoming blocked and the rate of water flow therethough diminishes until such time as the filter is replaced.

While domestic water treatment applications are known, they typically use only filtration to remove a variety of dissolved materials in the water. While ozone has become generally accepted in the field of municipal water treatment, it has not been adopted into wide scale application in the home. There are several reasons for this, one of which is consumer confidence. After water is treated with ozone, it contains decomposition products produced by the oxidizing action of ozone which are preferably removed prior to dispensing.

SUMMARY OF THE INVENTION

In accordance with the instant invention, there is provided a domestic countertop water treatment apparatus comprising a water treatment reservoir which has at least a vertical portion that is at least translucent; a housing having an ozone source in flow communication with the water treatment reservoir for treating water in the water treatment reservoir; a carbon block filter and a water pump mounted in the housing, the carbon block filter and the water pump in flow communication with the water treatment reservoir for removing treated water from the water treatment reservoir and passing the treated water through the carbon block filter; and, a treated water reservoir which has at least a vertical portion that is at least translucent and is positioned downstream from the carbon block filter for receiving treated water from the carbon block filter, wherein the rate of drop of the water level in the water treatment reservoir is form 60% to 140% of the rate of rise of the water level the treated water reservoir.

In accordance with another aspect of the instant invention, there is provided a domestic countertop water treatment apparatus comprising a water treatment reservoir which has at least a vertical portion that is at least translucent; a housing having an ozone source in flow communication with the water treatment reservoir for treating water in the water treatment reservoir; a carbon block filter and a water pump mounted in the housing, the carbon block filter and the water pump in flow communication with the water treatment reservoir for removing treated water from the water treatment reservoir and passing the treated water through the carbon block filter; and, a treated water reservoir which has at least a vertical portion that is at least translucent and is positioned downstream from the carbon block filter for receiving treated water from the carbon block filter whereby, as treated water is dispensed from the water treatment reservoir to the treated water reservoir, the level of water in the water treatment reservoir is visibly lowered while the level of water in the treated water reservoir is visibly raised.

In one embodiment, the apparatus further comprises a switch which, when actuated, automatically actuates the water pump to dispense treated water from the water treatment reservoir to the treated water reservoir.

In another embodiment, the apparatus further comprises a treated water dispenser, the treated water reservoir is separate from the housing and the switch is actuated when the treated water reservoir is positioned beneath the treated water dispenser.

In another embodiment, the ozone source comprises an ozone generator.

In another embodiment, each of the vertical strip of the water treatment reservoir and the treated water reservoir is transparent. Preferably all, or substantially all, of the water treatment reservoir and the treated water reservoir is sufficiently transparent so that a user may view the water level as it is reduced in the water treatment reservoir and view the water level in the treated water reservoir as the water is dispensed.

In another embodiment, the water treatment reservoir and the treated water reservoir have approximately the same volume.

In another embodiment, the rate of reduction of the water level in the water treatment reservoir is approximately the same as the rate of increase of the water level in the treated water reservoir.

In another embodiment, the carbon block filter has pores which are less than $50\mu$, preferably less than $10\mu$ and more preferably are less than $1\mu$.

BRIEF DESCRIPTION OF THE DRAWINGS

These and other advantages of the instant application will be more fully and clearly understood in connection with the following description of a preferred embodiment of the invention in which.

DESCRIPTION OF THE PREFERRED EMBODIMENT

Figure 1:
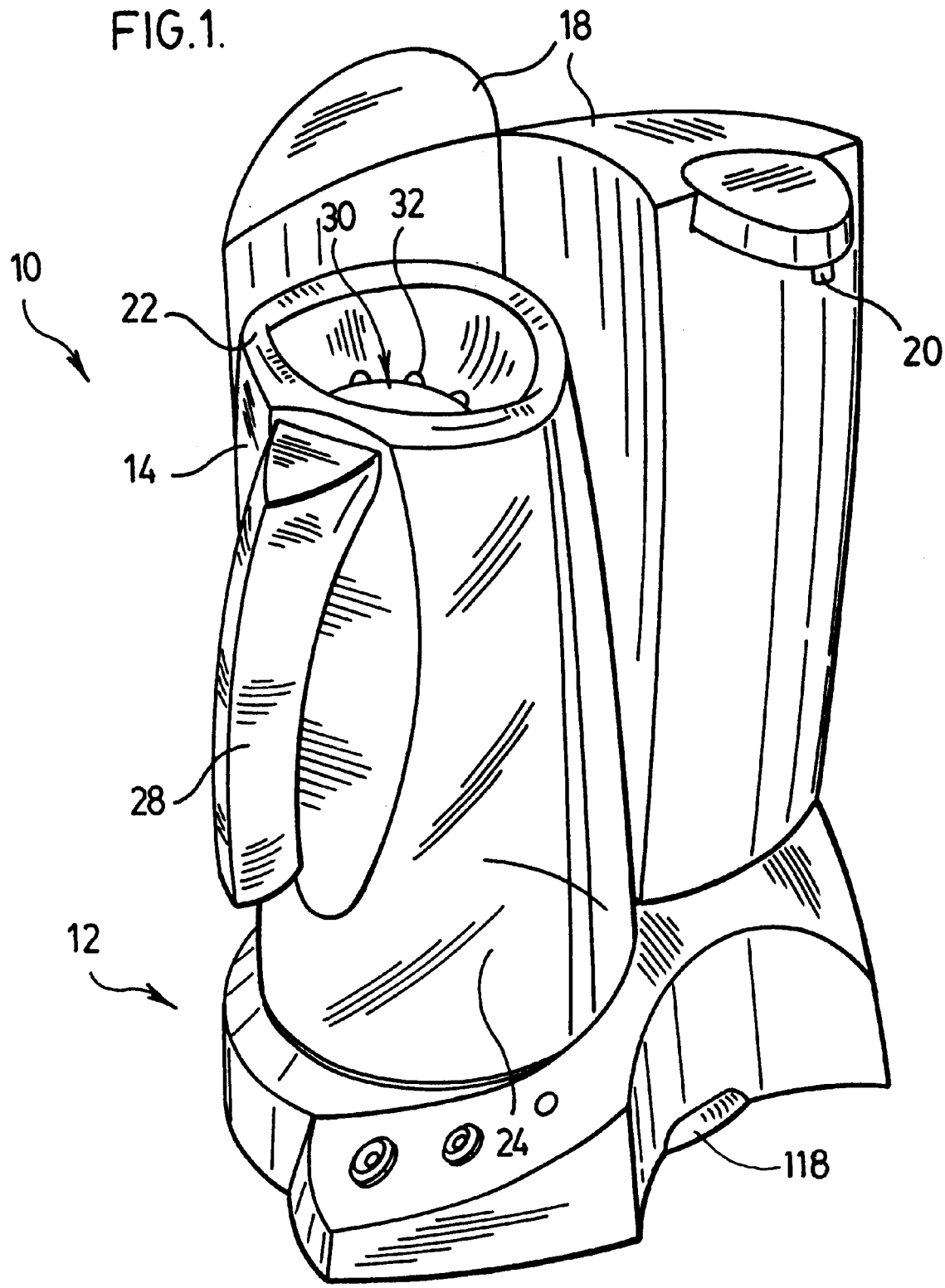
FIG. 1 is a perspective view of an apparatus according to the instant invention.
Figure 2:
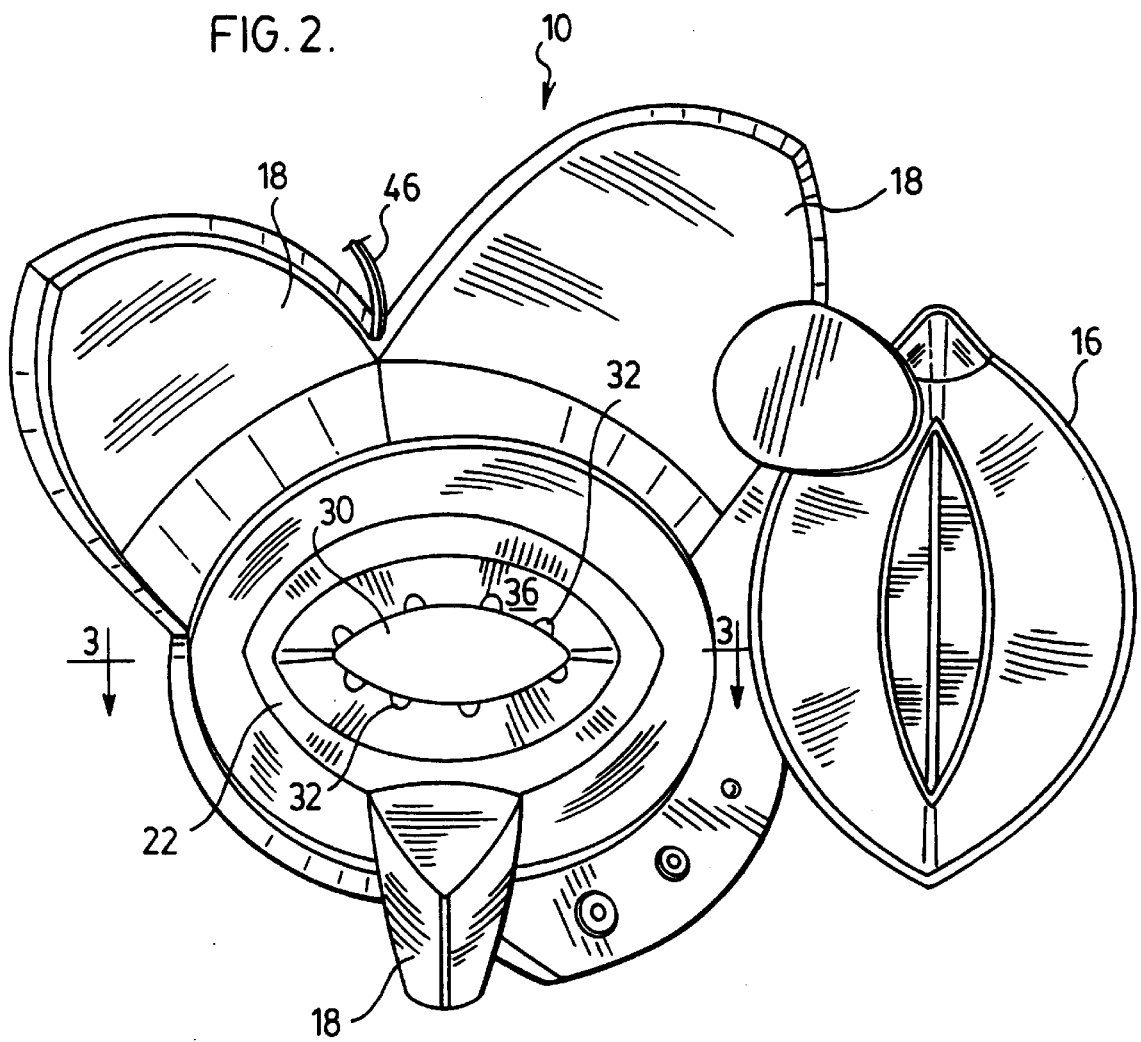
FIG. 2 is a top plan view of FIG. 1 with a treated water carafe shown in position for receiving water dispensed from the apparatus of FIG. 1.

Referring to FIGS. 1 and 2, the water treatment apparatus is generally designated by reference numeral 10. The apparatus comprises a base 12, removable treatment carafe 14 and housing 18. Housing 18 may be of any particular design and may contain any required sensing equipment, water filters, pumps and the like. Housing 18 is preferably connectable in flow communication with treatment carafe 14 such that treated water may be dispensed from dispenser 20 after the completion of the treatment cycle of the water in treatment carafe 14. As shown in FIG. 2, a treated water carafe 16 may be positioned underneath dispenser 20 for receiving the treated water.

The shape and configuration of treatment carafe 14 and treated water carafe 16 may be of any particular design which is aesthetically pleasing. As shown in particular in FIGS. 3 and 5, treatment carafe 14 has a top 22, side walls 24 and a bottom 26. Optionally, as shown in FIGS. 1 and 2, a handle 28 may be provided to allow the user to manipulate carafe 14.

Carafe 14 is designed to be filled with a liquid which is to be treated. In particular, it is preferred that the liquid is water. Carafe 14 is removably mounted to base 12. Accordingly, when the user wishes to treat water, the user may be move carafe 14, e.g. by means of handle 18. The top 22 of carafe 14 may be placed underneath a source of water (e.g. a kitchen tap) and the tap may be turned on to allow the carafe to be filled. Once filled, carafe 14 may then be placed on base 12.

Figure 5:
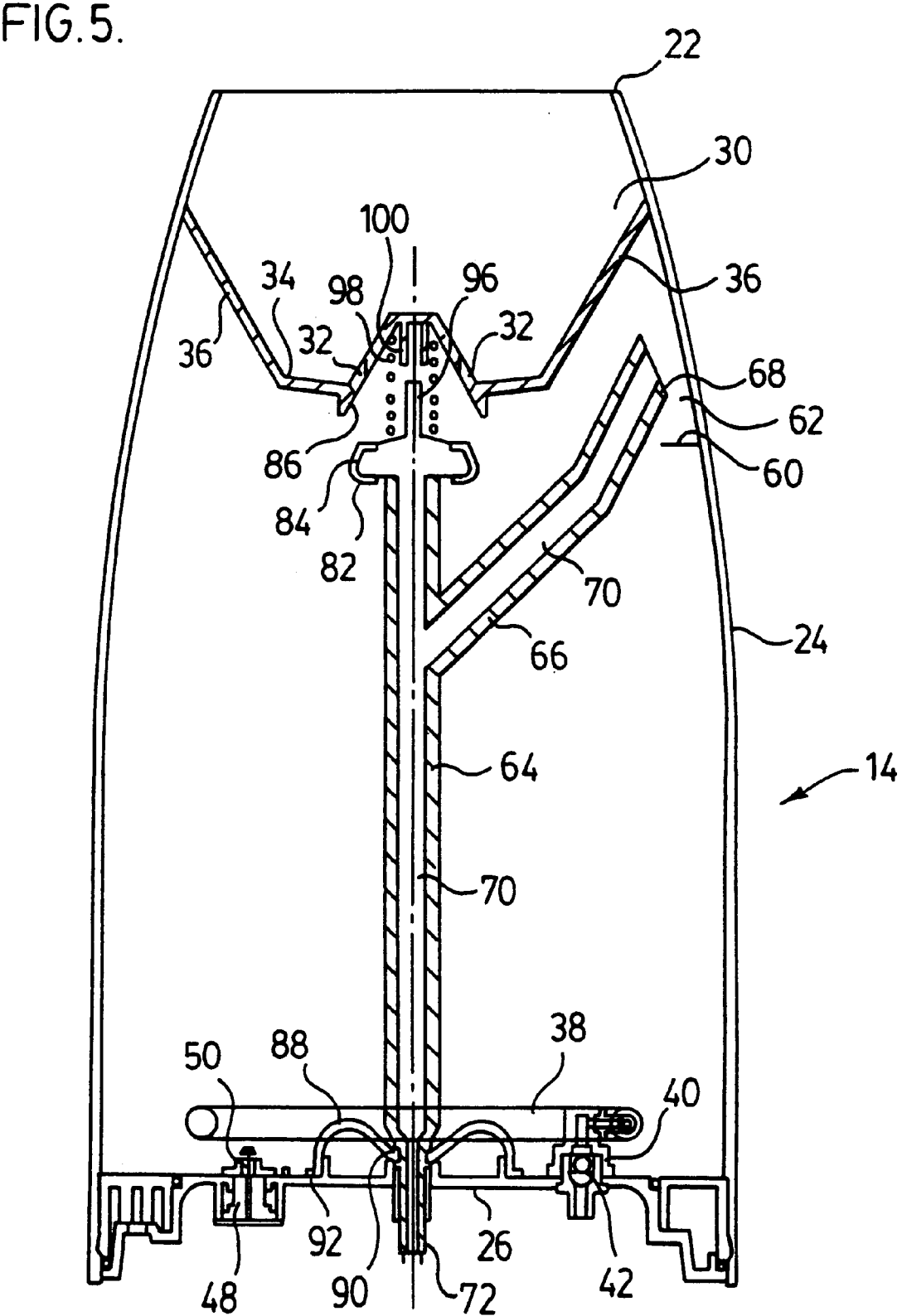
FIG. 5 is a cross-section along the line 3—3 of FIG. 2 of the treatment carafe when removed from the base portion of the apparatus; and, FIG. 6 is a front elevational view of the apparatus of FIG. 1 wherein the apparatus is dispensing treated water to a treated water carafe.

In one preferred embodiment of this invention, in order to simplify the filling operation, top 22 is provided with a recess 30. The upper portion of carafe 14 is provided with at least one, but preferably a plurality of water inlet ports 32 in recess 30. Recess 30 may be of any particular configuration which provides an open area in which the water to be treated may be poured so that it may drain into carafe 14 through water inlet ports 32. Accordingly, as shown in FIG. 5, recess 30 may be funnel shaped. For example, the upper portion of cavity 14 has an upper surface 34. A portion of upper surface 34 may comprise sloped portion 36 which extends downwardly towards the centre of carafe 30. By designing carafe 40 with a recess 32 containing water inlet ports 32, the user need not remove a lid from carafe 14 so as to fill it. It will be appreciated that the automatic sealing mechanism and the automatic gas conduit connection feature of this invention may be designed to work regardless of the shape of the top of carafe 14. For example, the top of carafe 14 may be flat and that inlet ports 32 may be provided in the flat top (not shown). The creation of a recess provides a funnel to reduce or prevent spillage during the filling operation.

The water in treatment carafe 14 is treated with an oxidizing gas. The oxidizing gas is preferably ozone. However, other oxidizing gases such as hydrogen peroxide are known. The remaining description is based upon a preferred embodiment in which the oxidizing gas is ozone.

When the treatment cycle is commenced, ozone is introduced into carafe 14. In the preferred embodiment, carafe 14 is provided with an annular sparger 38 which has a plurality of openings in the surface thereof. Sparger 38 is connected to a supply port 40. Supply port 40 has an associated valve 42. Base 12 is provided with a supply conduit 44 which is seated immediately below valve 42. Supply conduit 44 is in air flow communication with a source of ozone. For example, an air pump may be positioned upstream of supply conduit 44 so as to feed air to an ozone generator which in turn provides a feed supply of ozone to supply conduit 44. The air pump and the ozone generator may be provided in one of the housings 18. Electricity to run the electronics of the unit, including the air pump and the ozone generator, may be supplied by means of electric cord 46 (see FIG. 2).

Valve 42 is movable between an open position and a closed position. When valve 42 is in the closed position, sparger 38 is sealed. Accordingly, as water is introduced into carafe 14, water will not drain through supply port 40. When valve 42 is in the open position, ozone may be supplied via conduit 44, through port 40 into sparger 38. Valve 42 may be moved from the closed position to the open position by means of the force of ozone containing air passing through conduit 44. It is to be appreciated that valve 42 may be biased to the closed position by gravity, a spring or the like.

Treated water may be decanted from carafe 14 by any means known in the art. Accordingly, carafe 14 could be removed from base 12 and the water decanted such as by means of a spout or the like. Preferably, the treated water is decanted from carafe 14 while carafe 14 is positioned on base 12. To this end, a water exit port 48 may be provided in bottom 26 (see FIG. 3). A valve 50 is provided in water exit port 48. At the end of a cycle, valve 50 may be actuated, for example, by the means of solenoid 52. When solenoid 52 is actuated, linkage 54, moved engagement member 56 upwardly. This movement displaces engagement member 56 upwardly so as to move displacer rod 58 upwardly. The upward movement of displacer rod 58 moves valve 50 to the open position allowing the treated water to exit through water exit port 48. Water exit port 48 may be in flow communication with a water pump so as to pump the treated water through a filter 108 (e.g. a carbon block filter) which may be located in housing 18 and from there through dispenser 20 to, e.g. a glass or treated water carafe 16. Filter 108 preferably has pores which are less than $50\mu$, preferably less than $10\mu$ and more preferably less than $1\mu$ is size.

Figure 3:
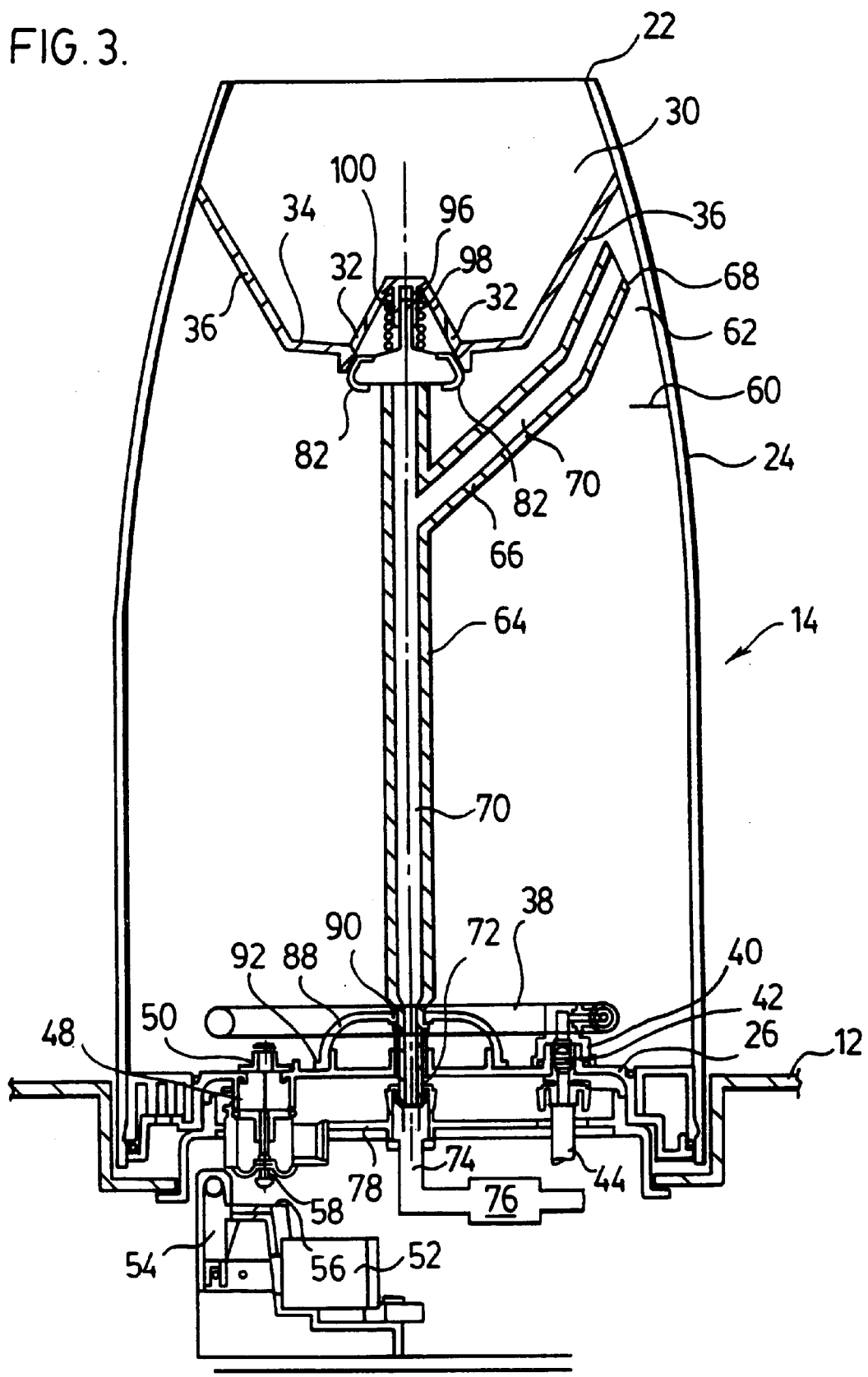
FIG. 3 is a cross-section along the line 3—3 in FIG. 2.

Carafe 14 may be provided with a fill line 60 so as to indicate to the user the portion of carafe 14 which should be filled with water to be treated. Fill line 60 may be provided at any location in carafe 14 provided a chamber or the like which acts as an off gas receiving means is provided above fill line 60 for receiving off gases. The top of carafe 14 may be flat if the carafe is not filled to the top. Alternately, the top of carafe 14 may be angled so as to direct the off gas to a particular location, head gas space 62. In the embodiment of FIGS. 3 and 5, the top of carafe 14 has an angled top to create an annular head gas space 62 in which the off gas may accumulate. During the treatment of water in carafe 14, ozone is bubbled through the water by means of sparger 38. The off gases accumulate above the water (e.g. above fill line 60) in head gas space 62.

Ozone may cause side effects in people exposed to sufficient quantities of these gases (e.g. headaches). Accordingly, the off gases are preferably collected and treated (e.g. by exposing them to a destructor which will convert the gas to a more benign form). For example, in the case of ozone, the destructor may be a catalyst for converting ozone to oxygen such as one or more of manganese dioxide, titanium dioxide, iron oxide and carbon. Contact between ozone and one or more of these catalyses will case the ozone to convert to oxygen which may then be released harmlessly from the system. Accordingly, in one preferred embodiment, carafe 14 includes a gas conduit having a first end in fluid flow communication with head gas space 62 and a second end which is connected in fluid flow communication with an off gas treatment member (e.g. a destructor) when carafe 14 is placed on base 12 and apparatus 10 is actuated to treat water in carafe 14.

Referring to FIG. 5, carafe 14 is provided with a support rod 64 having an arm 66. Arm 66 has an upper end 68 positioned in head gas space 62 when apparatus 10 is operational. Support rod 64 and arm 66 are hollow so as to define a passage 70 extending from head gas space 62 through bottom 26 of carafe 14. Support rod 64 is provided with an end portion 72 which is connectable in air flow communication with off gas conduit 74. Off gas conduit 74 is in air flow communication with off gas treatment member 76. Off gas treatment member 76 may optionally be positioned in one of the housings 18. Off gas treatment member 76 may be a destructor for catalytically converting the ozone to a benign gas. Alternately, it may be an off gas sensor, eg. so as to monitor the concentration of ozone in the off gas and provide feed back to the system so as to control the batch cycle. Alternately, a destructor and a sensor may be provided downstream of off gas conduit 74.

Preferably, upper end 68 is positioned above water inlet ports 32 so that, when the unit is filled, water will not enter into passage 70. It will also be appreciated that by placing upper end 68 to one side of carafe 14 (e.g. spaced from water inlet ports 32) that water will tend not to enter passage 70 as carafe 14 is filled. It will also be appreciated that upper end 68 may be configured so as to inhibit the entry of water regardless of the position of upper end 68 with respect to water inlet ports 32. As upper end 68 is positioned and/or configured so as not to allow water to enter passage 70 there through, end portion 72 need not include a valve member to seal passage 70. Accordingly, as shown in FIG. 5, end portion 72 may be opened when carafe 14 is removed from base 12.

Figure 4:
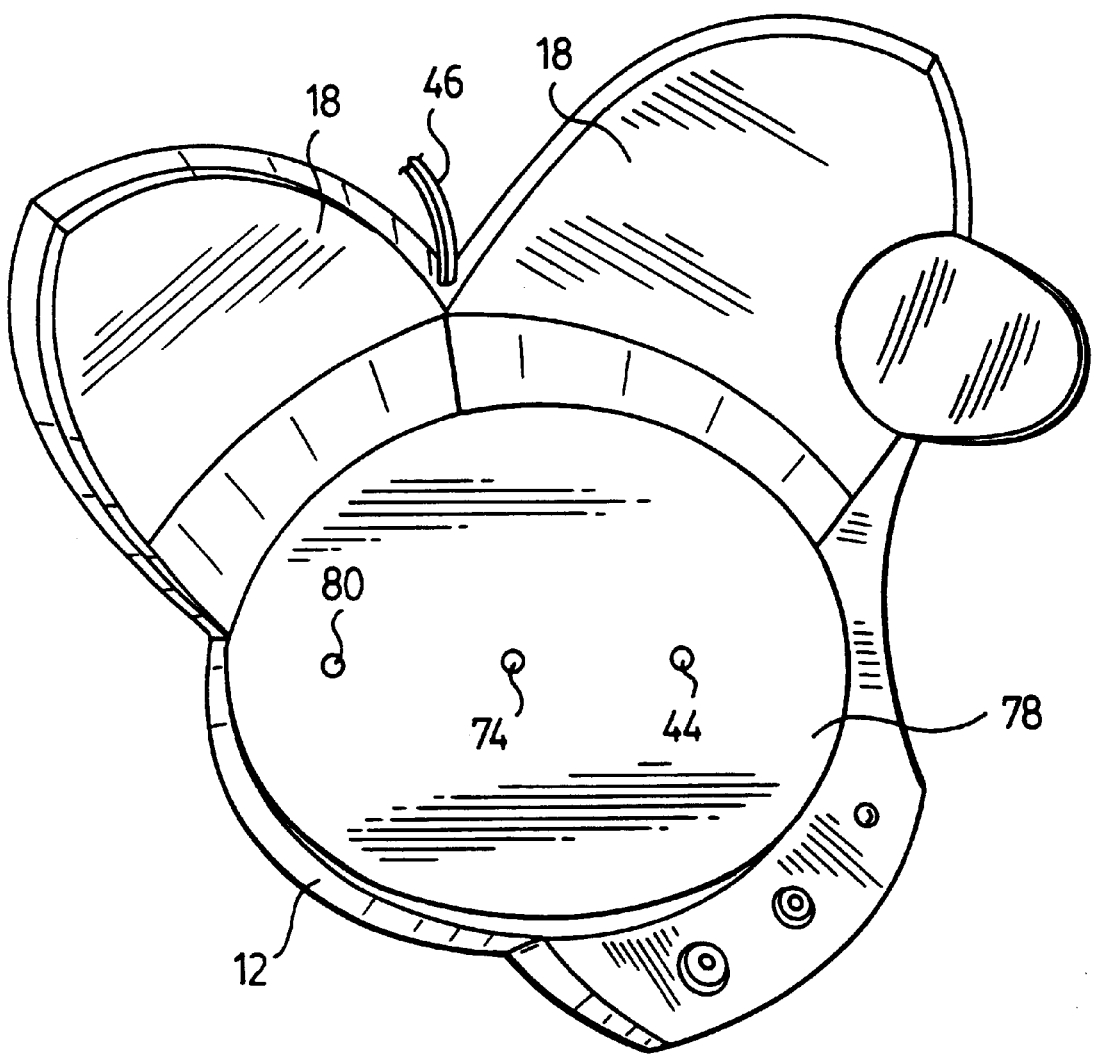
FIG. 4 is a top plan view of the apparatus shown in FIG. 4 with the treatment carafe removed therefrom.

Referring to FIG. 4, base 12 is shown having a generally horizontal upper surface 78. Upper surface 78 is configured so as to allow bottom 26 to be seated thereon. The seating of bottom 26 on upper surface 78 is shown in detail in FIG. 3. As shown in FIG. 4, three openings are provided in upper surface 78. The first is the upper end of supply conduit 44 which is engaged with supply port 40 when carafe 14 is placed on base 12. The second is the top of water outlet conduit 80 which receives treated water when valve 50 is opened. The third is the upper end of off gas conduit 74. End portion 72 engages the upper end of off gas conduit 74 when carafe 14 is placed on base 12.

Accordingly, it will be understood that one advantage of the instant invention is that head gas space 62 is automatically in communication with off gas conduit 74 by placing carafe 14 on base 12. The user need not make any connections between the carafe and an off gas treatment conduit. Accordingly, ozone will not be accidentally released during the operation of the unit if the consumer forgets to make a connection. Further, if an off gas sensor is used to control the duration of the treatment cycle, all of the off gas will be available for passage through a sensor via conduit 74.

In accordance with another embodiment of this invention, sealing member 82 is provided for closing water inlet ports. Sealing member 82 is movable between a first position in which water inlet 32 is sealed (see FIG. 3) and a second position in which the water inlet ports 32 are open (see FIG. 5). Referring to FIG. 3, when carafe 14 is placed on base 12 and is ready for a treatment cycle to begin, sealing member 32 is in the closed position. In this position, engagement surface 84 of sealing member 82 contacts engagement surface 86 of carafe 14 thereby creating a seal between water inlet 32 and the interior of carafe 14. As shown in FIG. 5, when carafe 14 is removed from the unit and is ready to be filled, sealing member 82 is displaced from engagement surface 86 thereby allowing water to enter through water inlet 32 into carafe 14.

A linkage, which is connected to sealing member 82, is provided for moving sealing member 82 between the second and first positions in response to the placement of carafe 14 on base 12. Thus, when carafe 14 is placed on base 12, carafe 14 is automatically sealed and ready for the commencement of a treatment cycle. In a preferred embodiment, sealing member 82 is provided at the upper end of support rod 64 which acts as the driving member. The engagement of end portion 72 into the upper end of off gas conduit 74 drives sealing member 82 (which may be a resilient member which is resistant to ozone) into engagement with engagement surface 86. Thus, end portion 72 comprises an actuating means drivingly connected to sealing member 82 and operably responsive to placement of carafe 14 on base 12. It will be appreciated that other means may be provided for moving the sealing means. For example, handle 28 may have a trigger to open sealing member 82 when the user picks up carafe 14. Thus the user may automatically open water inlet 32 when they pick up the carafe and seal water inlet 32 when they release handle 28.

In the preferred embodiment shown in FIGS. 3 and 5, support rod 64 (with end portion 72) operates both as the actuating means as well as the gas conduit means for connecting head gas space 62 with off gas conduit 74. It will be appreciated that different apparatus may be included in carafe 14 for performing each of these different functions. It will further be appreciated that only one of these two apparatus (i.e. one of the actuating means and the gas conduit means) may be provided in a carafe 14.

In order to prevent water from leaking from carafe 14 into off gas conduit 74, a sealing member may be provided. The sealing member may comprise a water tight bushing provided in bottom 26 surrounding end portion 72. Alternately, as shown in FIGS. 3 and 5, a diaphragm 88 may be provided. Diaphragm 88 is a deformable member (preferably a resilient member) which may be made from any ozone resistant material. The upper portion of diaphragm 88 has an opening defining an upper perimeter 90 which surrounds the upper end of end portion 72 and forms a water tight seal therewith. The lower portion of diaphragm 88 is provided with a lower perimeter 92 which is connected to the interior of bottom 26 so as to form a water tight seal with bottom 26. As support rod 64 moves downwardly to the open position (see FIG. 5) and then back upwardly to the sealed position (see FIG. 3) diaphragm 88 flexes downwardly and upwardly to maintain a water tight seal.

Support rod 64 may be designed so as to automatically move to the open position as shown in FIG. 5 due the force of gravity when carafe 14 is removed from base 12. Alternately, a biasing member (e.g. a spring or other resiliently deformable member) may be provided to bias support rod 64 to the open position. The biasing member may be provided so as to interact with any portion of support rod 64 (either upper end 96 or end portion 72). For example, a spring 98 may be provided around support arm 100 and upper end 96. Spring 98 exerts a downward pressure on support rod 64 at all times. Accordingly, when carafe 14 is removed from base 12, spring 98 will cause support rod 64 to move to the downward position. The weight of carafe 64 is sufficient, particularly when filled with water, to cause support rod 64 to move upwardly thereby compressing spring 98. Alternately, it will be appreciated that diaphragm 88 may be configured to bias support rod 64 to the open position.

In a preferred embodiment of the instant invention, both treatment carafe 14 and treated water carafe 16 each have at least a vertical section that is at least translucent and, preferably, is transparent or substantially transparent. Preferably, treatment carafe 14 and treated water carafe 16 are themselves constructed so that, in their entirety, they are at least translucent and, preferably, they are transparent or substantially transparent. Accordingly, the liquid level in both treatment carafe 14 and treated water carafe 16 is visible. Advantageously, by constructing at least a substantial portion of the carafe as transparent or substantially transparent, the user can view the ozonation process and can monitor the liquid level as the treated water is withdrawn from treatment carafe 14 and is received in treated water carafe 16.

Figure 6:
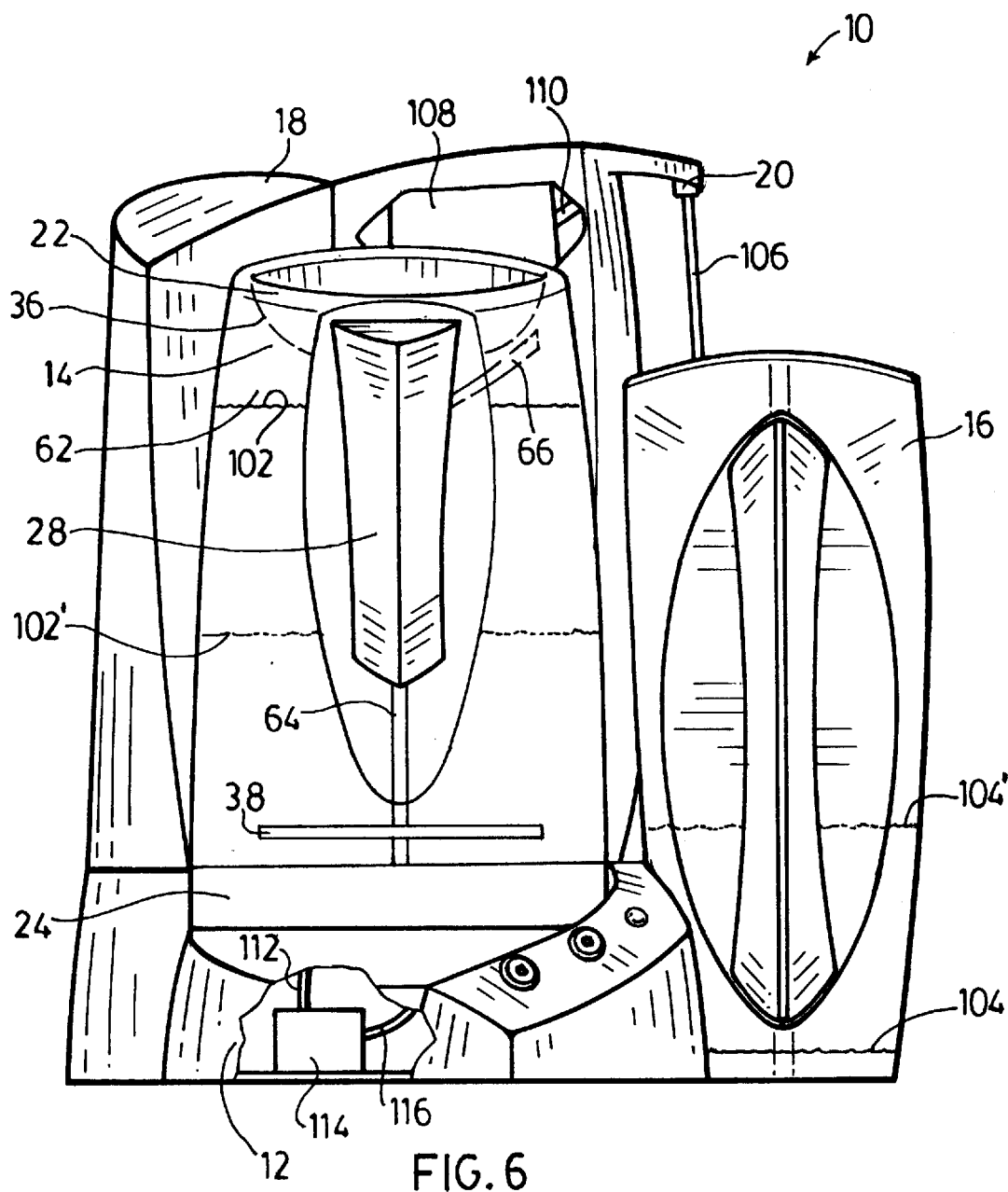

Referring in particular to FIG. 6, water level 102 is visible to an observer from the exterior of treatment carafe 14. Similarly, water level 104 in treated water carafe 16 is visible from the exterior. When the dispense cycle is initiated, treated water is drawn from treatment carafe 14 via water exit port 48. The water travels through conduit 112 to water pump 114. The water exits water pump 114 via conduit 116 which transports it to carbon block filter 108. The water passes through carbon block filter where residual ozone and decomposition products produced by the oxidizing action of ozone in treatment carafe 14 are removed. The filtered water is then transported via conduit 110 to dispenser 20 where the dispensed water 106 is dispensed from apparatus 10 and enters treated water carafe 16 via an opening in the upper portion thereof. As water is dispensed, the consumer visibly sees water level 102 dropping in carafe 14 and rising in treated water carafe 16 preferably at about the same rate. In particular, during dispensing, as water level 102 drops to level 102', for example, water level 104 in carafe 16 increases, for example, to level 104'. The fact that the water level in carafe 14 is dropping at the same time and at about the same rate as the water level in carafe 16 is rising provides a consumer with a visual check that the water is passing through carbon block filter 108. It will be appreciated, that slight differences in the rate of drop of the water level in treatment carafe 14 and the rate of rise of the water level in treated water carafe 16 will not be apparent to a user. Therefore, the rate of drop of the water level in treatment carafe 14 and the rate of rise of the water level in treated water carafe 16 need not be the same. Preferably, the rate of drop of the water level in treatment carafe 14 may be form 60% to 140% of the rate of rise of the water level in treated water carafe 16, more preferably from 75% to 125% and most preferably from 85% to 115%.

It will be appreciated that other filter media may be used in the treatment of water may be utilized. It will further be appreciated that this aspect of the invention is applicable even if carafe 14 is not removable from base 12.

Preferably, apparatus 10 includes an automatic dispense button 118 (see FIG. 1). When automatic dispense button 118 is depressed, pump 114 will be automatically actuated once the treatment cycle in treatment carafe 14 is completed. Preferably, auto dispense button 118 is positioned on apparatus 10 such that it is automatically depressed when carafe 16 is positioned in place beneath dispenser 20. Accordingly, when the treatment cycle is complete, the water will automatically dispense from dispenser 20 and the consumer will visually be able to monitor the transfer of water from treatment water carafe to treated water carafe 16.

It will be appreciated by those skilled in the art that various additions and modifications may be made to the instant invention and all of these are within scope of the following claims.

I claim:

1. A domestic countertop water treatment apparatus comprising:
    (a) a water treatment reservoir which has at least a vertical portion that is at least translucent;
    (b) a housing having an ozone source in flow communication with the water treatment reservoir for treating water in the water treatment reservoir;
    (c) a carbon block filter and a water pump mounted in the housing, the carbon block filter and the water pump in flow communication with the water treatment reservoir for removing treated water from the water treatment reservoir and passing the treated water through the carbon block filter; and,
    (d) a treated water reservoir which has at least a vertical portion that is at least translucent and is positioned downstream from the carbon block filter for receiving treated water from the carbon block filter
wherein the apparatus is constructed such that the rate of drop of the water level in the water treatment reservoir is from 60% to 140% of the rate of rise of the water level the treated water reservoir during apparatus operation.

2. The apparatus as claimed in claim 1 further comprising a switch which, when actuated, automatically actuates the water pump to dispense treated water from the water treatment reservoir to the treated water reservoir.

3. The apparatus as claimed in claim 2 wherein the housing further comprises a treated water dispenser, the treated water reservoir is separate from the housing and the switch is actuated when the treated water reservoir is positioned beneath the treated water dispenser.

4. The apparatus as claimed in claim 1 wherein the ozone source comprises an ozone generator.

5. The apparatus as claimed in claim 1 wherein each of the water treatment reservoir and the treated water reservoir is transparent.

6. The apparatus as claimed in claim 1 wherein the water treatment reservoir and the treated water reservoir have approximately the same volume.

7. The apparatus as claimed in claim 1 wherein the carbon block filter has pores which are less than $50\mu$.

8. The apparatus as claimed in claim 1 wherein the carbon block filter has pores which are less than $10\mu$.

9. The apparatus as claimed in claim 1 wherein the carbon block filter has pores which are less than $1\mu$.

10. A domestic countertop water treatment apparatus comprising:
    (a) a water treatment reservoir which has at least a vertical portion that is at least translucent;
    (b) a housing having an ozone source in flow communication with the water treatment reservoir for treating water in the water treatment reservoir;
    (c) a carbon block filter and a water pump mounted in the housing, the carbon block filter and the water pump in flow communication with the water treatment reservoir for removing treated water from the water treatment reservoir and passing the treated water through the carbon block filter; and,
    (d) a treated water reservoir which has at least a vertical portion that is at least translucent and is positioned downstream from the carbon block filter for receiving treated water from the carbon block filter
whereby, the apparatus is constructed such that as treated water is dispensed from the water treatment reservoir to the treated water reservoir, the level of water in the water treatment reservoir is visibly lowered while the level of water in the treated water reservoir is visibly raised during apparatus operation.

11. The apparatus as claimed in claim 10 wherein the rate of reduction of the water level in the water treatment reservoir is approximately the same as the rate of increase of the water level in the treated water reservoir.

12. The apparatus as claimed in claim 10 wherein the rate of drop of the water level in the water treatment reservoir is form 60% to 140% of the rate of rise of the water level the treated water reservoir.

13. The apparatus as claimed in claim 10 wherein the rate of drop of the water level in the water treatment reservoir is form 75% to 125% of the rate of rise of the water level the treated water reservoir.

14. The apparatus as claimed in claim 10 wherein the rate of drop of the water level in the water treatment reservoir is form 85% to 115% of the rate of rise of the water level the treated water reservoir.

15. The apparatus as claimed in claim 10 wherein each of the vertical strip of the water treatment reservoir and the treated water reservoir is transparent.

16. The apparatus as claimed in claim 10 wherein each of the water treatment reservoir and the treated water reservoir is substantially transparent.

17. The apparatus as claimed in claim 16 wherein the water treatment reservoir and the treated water reservoir have approximately the same volume.

18. The apparatus as claimed in claim 10 wherein the water treatment reservoir and the treated water reservoir have approximately the same volume.

19. A domestic countertop water treatment apparatus comprising:

(a) a water treatment reservoir;

(b) a housing having an ozone source in flow communication with the water treatment reservoir for treating water in the water treatment reservoir;

(c) a carbon block filter and a water pump mounted in the housing, the carbon block filter and the water pump in flow communication with the water treatment reservoir for removing treated water from the water treatment reservoir and passing the treated water through the carbon block filter; and, (d) a treated water reservoir which is positioned downstream from the carbon block filter for receiving treated water from the carbon block filter the water treatment reservoir and the treated water reservoir being constructed so that the water level as it is reduced in the water treatment reservoir and the water level as it is raised in the treated water reservoir are visible to a user as the water is dispensed from the water treatment reservoir to the treated water reservoir.

20. The apparatus as claimed in claim 19 wherein the rate of drop of the water level in the water treatment reservoir is substantially perceptually the same to the user as the rate of rise of the water level the treated water reservoir when the water is dispensed.

* * * * *